(12) United States Patent
Mason

(10) Patent No.: US 6,382,898 B2
(45) Date of Patent: May 7, 2002

(54) BOAT LOADING AND CARRYING APPARATUS FOR VEHICLES

(76) Inventor: Leon Mason, 184 Ivy Lea Rd., Landsdowne, Ontario (CA), K0E 1L0

( * ) Notice: Subject to any disclaimer, the term of this patent is extended or adjusted under 35 U.S.C. 154(b) by 0 days.

(21) Appl. No.: 09/782,075

(22) Filed: Feb. 14, 2001

(51) Int. Cl.⁷ ............................................. B60R 9/042
(52) U.S. Cl. ...................................... 414/462; 414/559
(58) Field of Search ................................ 414/462, 538, 414/559

(56) References Cited

U.S. PATENT DOCUMENTS

| | | | |
|---|---|---|---|
| 3,170,583 A | * | 2/1965 | Meyer .......................... 414/462 |
| 3,343,696 A | * | 9/1967 | Morrison ...................... 414/462 |
| 3,843,002 A | * | 10/1974 | Pihlgren ....................... 414/462 |
| 3,872,989 A | * | 3/1975 | Smithson et al. ............ 414/462 |
| 4,239,438 A | | 12/1980 | Everson |
| 4,269,561 A | | 5/1981 | Rutten |
| 4,274,788 A | * | 6/1981 | Sutton ........................ 414/462 |
| 5,609,462 A | | 3/1997 | Reimer |

* cited by examiner

*Primary Examiner*—Janice L. Krizek
(74) *Attorney, Agent, or Firm*—Ronald G. Bitner

(57) ABSTRACT

An apparatus for loading and retaining for transport, an article, such as a boat, onto a vehicle, particularly a pickup truck. The apparatus comprises a pivoting rear frame member and a forward supporting frame member attached to the truck. The rear frame member has a laterally spaced pair of arms which are pivotally attached to the vehicle, such as onto the trailer hitch of the vehicle, and an upper interconnecting portion for supporting a rear portion of the boat. The rear frame member raises the boat as it is pivoted from a near horizontal position to a vertical position, by suitable means such as a winch.

10 Claims, 3 Drawing Sheets

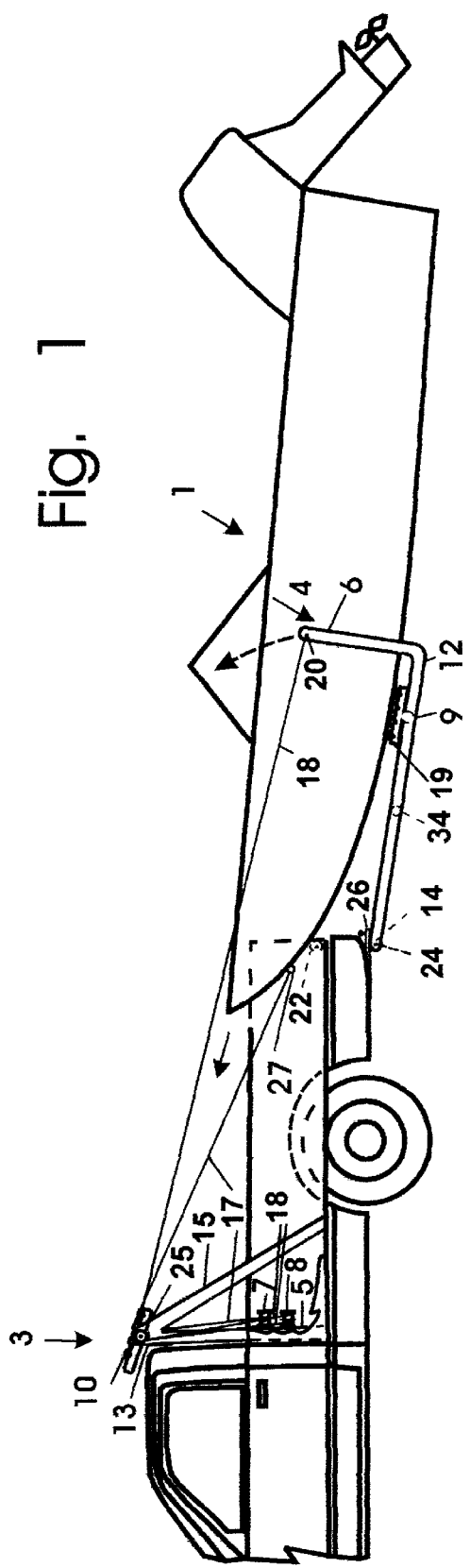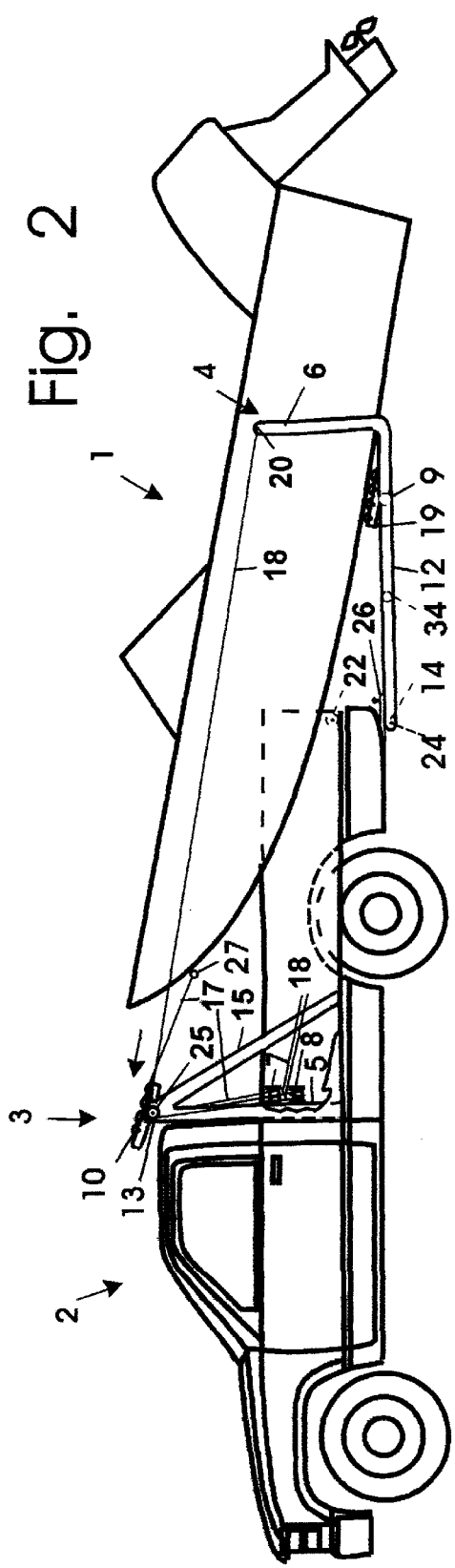

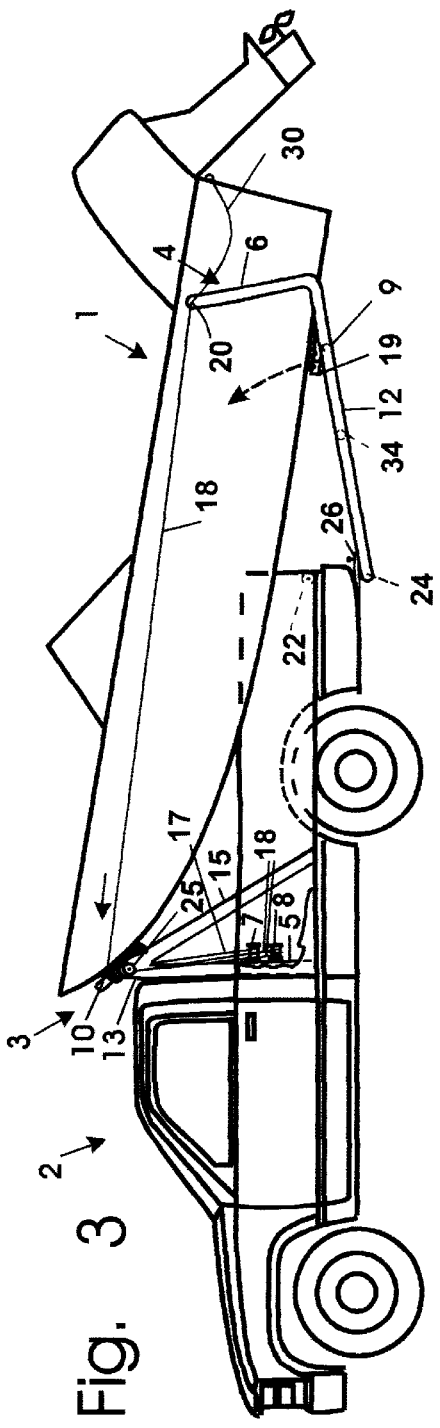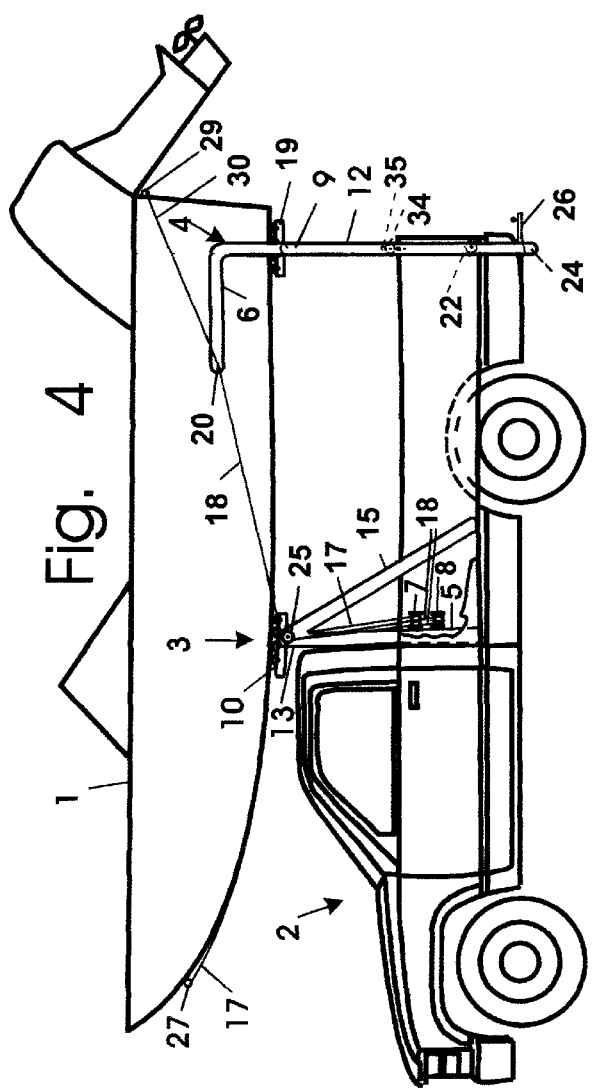

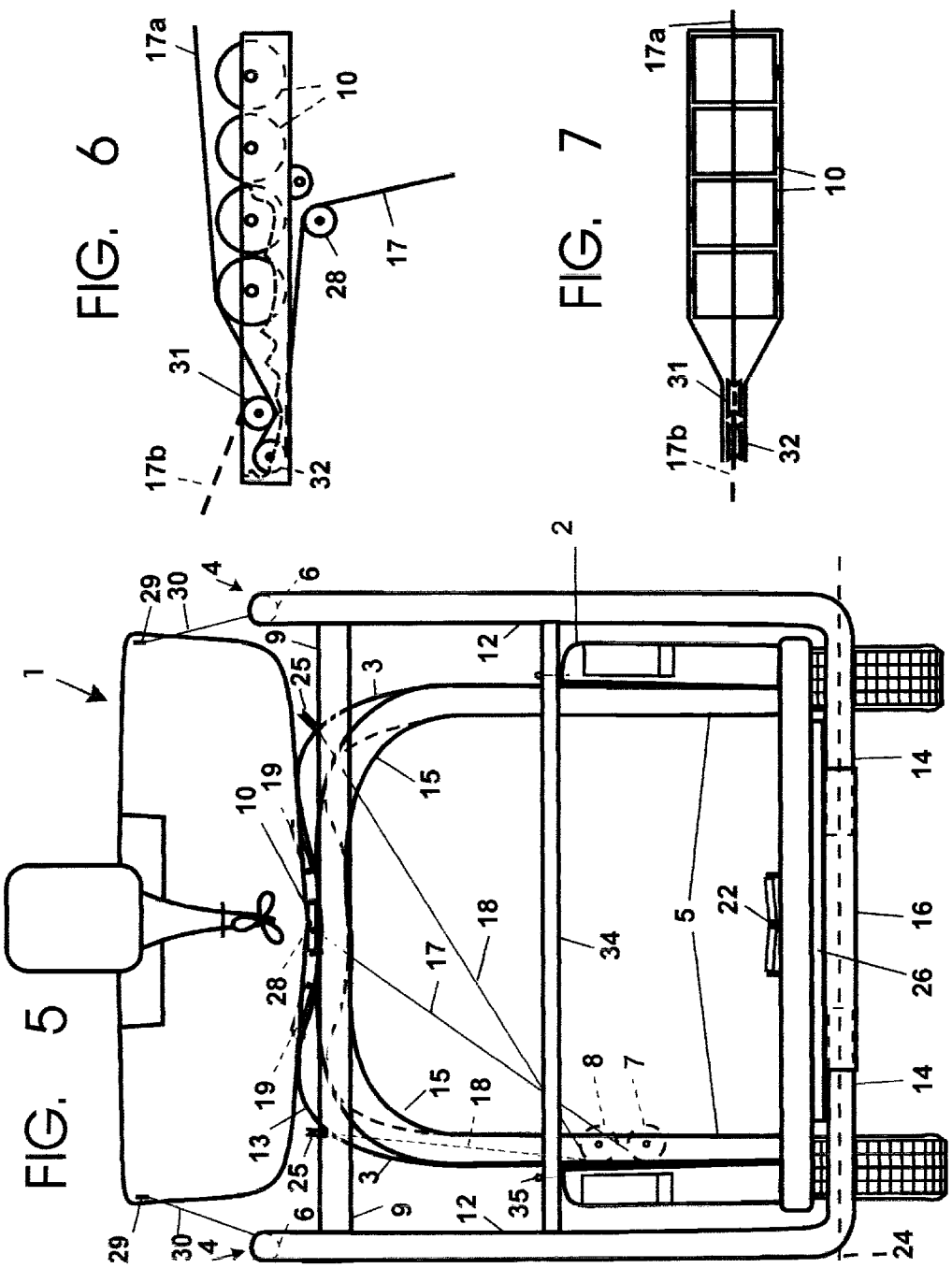

BOAT LOADING AND CARRYING APPARATUS FOR VEHICLES

FIELD OF THE INVENTION

This invention relates to a loading and carrying apparatus for attachment to a vehicle, and particularly for loading and carrying a boat on a pickup truck.

BACKGROUND OF THE INVENTION

Various devices have been used for loading a boat onto a vehicle. The known devices are relatively complex in construction and in operation.

One example of a previously proposed device is described in U.S. Pat. No. 4,239,438 which discloses a device for lifting and carrying loads on top of pickup trucks and which includes a fixed frame over the bed and the cab of a pickup truck and a pair of slanting rails along the sides of the fixed frame. The described device is relatively complex in construction and limits uses of the pickup when installed.

SUMMARY OF THE INVENTION

An object of the present invention to provide an apparatus for loading and carrying an object, such as a boat, onto a vehicle, particularly a pickup truck.

Another object of the present invention is to provide a relatively simple apparatus for loading and carrying an object, such as a boat, onto a vehicle, wherein components of the apparatus take up little space, allowing the vehicle to be used for other purposes when not transporting an object.

It has been found that a boat loading and carrying apparatus of simple construction and operation can be provided with a pair of frame members, with a rear frame pivotally attached to a rear lower portion of the vehicle and a forward supporting frame being attached to a more forward portion of the vehicle.

The present invention provides a loading and carrying apparatus for attachment to a vehicle comprising: a rear frame member having a laterally spaced pair of members having lower pivot means for pivotally attaching to a lower rear portion of the vehicle for pivoting about a horizontal transverse axis, and an upper interconnecting portion including rear support means for supporting the load, a forward frame member having a lower portion for attaching to the vehicle spaced from the rear frame member, said forward frame member including an upper portion having front support means for supporting a load; and means for pivoting the rear frame member.

BRIEF DESCRIPTION OF THE DRAWINGS

FIGS. 1 to 4 are schematic representations of one embodiment of the apparatus shown at various stages of loading a boat onto a vehicle.

FIG. 1 shows the apparatus at an early stage of loading,

FIGS. 2 and 3 show intermediate stages, and

FIG. 4 shows the boat loaded for transport.

FIG. 5 is an end view of the apparatus shown in FIG. 4 taken from the rear of the vehicle.

FIG. 6 is a side schematic view showing details of the upper roller and pulley assembly.

FIG. 7 is a top schematic view showing details of the upper roller and pulley assembly shown in FIG. 6.

DETAILED DESCRIPTION

FIGS. 1 to 4 illustrate one embodiment of the present invention, shown used for loading and carrying a boat 1, on a vehicle 2, shown as a pickup truck.

FIG. 1 shows the apparatus at an early stage in loading, while FIGS. 2 and 3 show intermediate stages, and FIG. 4 shows the boat loaded for transport.

With reference to FIGS. 1 to 4, the apparatus includes a pivoting rear frame member 4, and a forward supporting frame member 3. The rear frame member 4 is pivotally attached at 14 to a lower rear portion of the vehicle while the forward frame member 3 is shown mounted to a forward portion of the truck bed.

The forward frame 3, shown in the form of an inverted generally U-shaped or M-shaped member, includes a lower portion 5 for attaching to the vehicle 2, and an upper horizontal portion 13 with a cradle with rollers 10 for guiding and supporting the boat 1.

The forward frame member 3 is shown and is shown including a pair of brace members 15. The brace members 15 extend obliquely downward from the forward frame and preferably in close proximity to the side walls of the vehicle 2 so as not to take up unnecessary space in the box of the pickup truck 2.

With reference to FIG. 5, the rear frame member 4 includes a laterally spaced pair of tubular members 12 having lower arms 14 pivotally attached, via tubular member 16, to the vehicle, to provide pivoting about a horizontal transverse axis 24. As shown, the pivoting means comprises a cylindrical member 16 which mates with cylindrical ends 14 of frame members 4.

Many vehicles used for transporting boats will be equipped with a standard trailer hitch, one common type being a REESE TM hitch. Accordingly, the rear frame member 4 may be adapted to be attached to such a trailer hitch. With reference to FIG. 5, the lower tubular members 14 of rear frame member 4 are pivotally attached to tubular member 16, which in turn is attached to the vehicle hitch 26.

An upper portion 9 of the frame member 4, shown provided with supporting rollers 19, supports the rear portion of the boat 1. Pivoting of the rear frame member allows it to be raised and lowered, along with the boat, with the use of a winch 8, as will be described.

Referring to FIGS. 1 to 4, the rear frame member 4 is shown in the form of a pair of tubular members each having a portion 12 extending substantially radially from the pivot axis 24 and an end portion 6 extending at an angle such that the point of attachment 20 of the cable 18 is above the pivot axis 24, when the frame 4 is in a lower position, as shown in FIGS. 1 and 2. This arrangement provides a leverage arm for an increased mechanical advantage for the early stage for of pivoting and lifting of the frame member 4 and boat 1.

An intermediate portion of the rear frame member 3 includes a lower horizontal member 33, that is adapted to be secured to the vehicle by suitable means 34, to secure the rear frame member 3 for transport, and also to increase rigidity.

The vehicle will preferably be provided with guide means, such as a roller 22, for attachment to a rear portion of the truck bed to guide and support the boat in the early stage of loading of a boat, as shown in FIGS. 1 and 2.

A winch 7, and cable 17 connected to the boat at 27, is used for drawing the boat onto the truck while winch 8, and a pair of cables 18 attached to the frame member 4, are used for raising the rear end of the boat into position, as will be described. The drum winch 8 will preferably have a divider, to provide two equal drum sections, to properly reel each of the two cables 18.

Referring to FIG. 5 and FIG. 7, pulleys 28 and 25 redirect the cable 17 and cable pair 18, respectively, from the generally upward directions to the generally horizontal direction. FIGS. 6 and 7 show details of the upper roller and pulley assembly which is attached to the forward frame member 3. Referring to FIGS. 2, 4, 6 and 7, pulleys 31 and 32 direct the cable 17 either rearward (17a) or forward (17b) depending on the relative position of the attachment point 27 relative to the rollers 10, as will be described.

With reference to FIGS. 3 and 4, an additional cable 30, also attached to the pivoting frame 4 at 20, pulls the rear of the boat forward when the rear frame 4 is pivoted upward and forward, as is described below.

In operation, with reference to FIGS. 1 to 5, the winch 7 with cable 17 pulls the boat 1 onto the vehicle 2 over the rollers 19 of frame 4 and onto roller 22 at the back end of the truck. The winch 7 and cable 17 pulls and supports the boat to the position shown in FIG. 3, at which stage the front end of the boat contacts, and is supported by, the rollers 10.

At an intermediate stage of loading, such as shown in FIG. 2 or 3, the rear frame member 4 is pivoted forward by means of winch 8 with cables 18, from the near horizontal position as shown in FIG. 2, to the vertical position as shown in FIG. 4, thereby raising the rear portion of the boat, while at the same time the forward end of the boat is supported initially by the cable 17, and subsequently by the rollers 10.

It should be noted that when the point of attachment 27 passes from a position behind the rollers 10, such as shown in FIG. 2, to a position in front of the rollers as shown in FIG. 4, the cable 17 is re-directed by pulleys 31 and 32, as shown in FIGS. 6 and 7, from rearward (17a) to forward (17b).

In the final stage of pivoting (after that shown in FIG. 3) the boat will be pulled forward by the cable 30, which is attached to the boat at 29, as the leverage arm 6 of the frame 4 pivots forward and upward into the position as shown in FIG. 4.

In the elevated position (as in FIG. 4) the lower horizontal member 33 is secured to the vehicle by suitable means 34, to secure the rear frame member 3 for transport. The boat can be additionally secured to the vehicle for transport by additional securing means in a conventional manner.

The unloading operation is basically the reverse of the above. The winch 7 with cable 17 may be used initially to pull the boat rearward, from the position shown in FIG. 4, to the stage at which the point of attachment 27 of cable 17 on the boat 1 approaches the rollers 10 and pulley 28. As the boat is moved rearward, the rear frame 4 pivots rearward and lowers the rear end of the boat. At this stage (see FIG. 3) the boat will descend under the force of gravity, and the descent rate can be controlled by winch 8 and cable 18. At the same time (see FIG. 2) the winch 7 with cable 17 can be used to support the front end of the boat until it contacts the roller 22.

It will be understood that the apparatus may take other forms from that illustrated in the drawings, depending on the structure of the vehicle and the boat, or particular object to be loaded. For example, other arrangements of winches, or alternative devices, may be used for pivoting the rear frame member and loading the boat, or other object, and the rear pivoting frame member may be pivotally attached to the vehicle by means other than that shown.

What is claimed is:

1. A loading and carrying apparatus for attachment to a vehicle comprising:

a rear frame member having a laterally spaced pair of members having lower pivot means for pivotally attaching to a lower rear portion of the vehicle for pivoting about a horizontal transverse pivot axis, and an upper interconnecting portion including rear support means for supporting a load;

a forward frame member having a lower portion for attaching to the vehicle spaced from the rear frame member, said forward frame member including an upper portion having front support means for supporting the load;

a horizontal tubular member for attachment to a lower rear portion of the vehicle, and wherein the rear frame member includes a pair of lower horizontal arms for mating with end portions of said horizontal tubular member; and means for pivoting the rear frame member between a generally horizontal position and a vertical position.

2. The device of claim 1, further comprising means for pulling the load forward onto the vehicle.

3. The device of claim 1, further comprising rollers on the upper portion of each of the rear frame member and the forward frame member for movably supporting the load.

4. The device of claim 1, wherein the load is a boat.

5. The device of claim 1, wherein the vehicle is a pickup truck.

6. The device of claim 1, wherein the rear frame member includes a lower horizontal member adapted to be attached to the vehicle to secure the rear frame member for transport.

7. The device of claim 1, wherein the means for pivoting the rear frame member includes a winch and cable.

8. The device of claim 7, further comprising a second winch for pulling the load onto the vehicle.

9. The device of claim 7, wherein the rear frame member comprises a portion extending substantially radially from the pivot axis and a lever end portion extending at an angle such that a point of attachment of the cable with respect to the rear frame member is above the horizontal transverse pivot axis when the frame is in a lower position.

10. A loading and carrying apparatus for attachment to a vehicle comprising:

a rear frame member having a laterally spaced pair of members having lower pivot means for pivotally attaching to a lower rear portion of the vehicle for pivoting about a horizontal transverse pivot axis, and an upper interconnecting portion including rear support means for supporting a load;

a forward frame member having a lower portion for attaching to the vehicle spaced from the rear frame member, said forward frame member including an upper portion having front support means for supporting the load;

a cradle with rollers for attachment to a lower rear portion of the vehicle, and means for pivoting the rear frame member between a generally horizontal position and a vertical position.

* * * * *